United States Patent [19]

Forgione

[11] 3,770,588

[45] Nov. 6, 1973

[54] STORAGE STABILIZATION OF CARRIER BOUND ENZYMES

[75] Inventor: Peter Salvatore Forgione, Stamford, Conn.

[73] Assignee: American Cyanamid Company, Stamford, Conn.

[22] Filed: Oct. 2, 1972

[21] Appl. No.: 294,044

Related U.S. Application Data

[63] Continuation-in-part of Ser. No. 57,340, July 22, 1970, abandoned.

[52] U.S. Cl. ................ 195/63, 195/31 R, 195/68, 195/DIG. 11
[51] Int. Cl. ............................................. C07g 7/02
[58] Field of Search ................ 195/63, 68, DIG. 11; 260/8

[56] References Cited
UNITED STATES PATENTS

| | | | |
|---|---|---|---|
| 1,855,692 | 4/1932 | Wallerstein | 195/63 |
| 3,282,702 | 11/1966 | Schreiner | 195/63 X |
| 3,271,334 | 9/1966 | Kern et al. | 260/8 |
| 3,133,001 | 5/1964 | Muset et al. | 195/68 |

OTHER PUBLICATIONS

Silman et al., Water–Insoluble Derivatives of Enzymes, Antigens, and Antibodies, Annual Reviews of Biochemistry, Annual Reviews, Inc., California, Part II. Vol. 35, 1966 (pp. 886–889) QP501A7.

Dixon et al., Enzymes, 2nd. Ed. Academic Press Inc., N.Y., 1964 (pp. 13, 36, 37, 150, 466 & 467) QP601.D5e c.2

*Primary Examiner*—David M. Naff
*Attorney*—Frank M. Van Riet

[57] ABSTRACT

A method for maintaining the catalytic activity of a hydrophilic, catalytically active carrier bound enzyme material which comprises freeze-drying the material from a solution of the substrate which is normally converted to its conversion product by the bound enzyme.

13 Claims, No Drawings

STORAGE STABILIZATION OF CARRIER BOUND ENZYMES

CROSS-REFERENCE TO RELATED APPLICATION

This application is a continuation-in-part of my co-pending application, Ser. No. 57,340, filed July 22, 1970 now abandoned and entitled STORAGE STABILIZATION.

BACKGROUND OF THE INVENTION

The binding of enzymes to suitable carriers in order to insolubilize said enzymes and thereby render them repeatedly or continuously useful for the conversion of enzymatically convertible substrates has been of interest in recent years. Specifically, Silman et al., Water-Insoluble Derivatives of Enzymes, Antigens and Antibodies, Annual Review of Biochemistry, Vol. 35, Part II, P. D. Boyer, Editor; Annual Review Inc., Palo Alto, Calif.; pages 873–908; 1966, discuss many methods for binding enzymes to carriers, including adsorption, inclusion inside the lattice of the carrier, covalent binding and covalent cross-linking.

In my abandoned application Ser. No. 8,089, filed Feb. 2, 1970, and hereby incorporated herein by reference, there is disclosed and claimed a unique class of polymer bound enzymes and a method for their production. The products of said application and those commercially available in commerce, although of high activity, tend to lose their activity or deteriorate after standing at room conditions for relatively short periods of time. As a result, storage and shipment of the polymers, especially at room temperature, for subsequent usage is relatively difficult.

SUMMARY

I have now found that the catalytic activity of enzymes bound to carriers can be maintained, stabilized or otherwise be prevented from deactivation by freeze-drying the carrier bound enzyme from a solution of the substrate which is normally converted to its conversion product by the bound enzyme. By "carrier bound enzyme," as used herein, is meant the product produced by binding an enzyme to a carrier by any of the four mechanisms mentioned above and described by Silman et al. in said article.

DESCRIPTION OF THE INVENTION INCLUDING PREFERRED EMBODIMENTS

The compositions which are stabilized against deactivation according to my invention comprise a hydrophilic carrier having a catalytically active enzyme bound thereto. Any carrier having these properties may be utilized herein and the enzyme may be bound thereto in any known manner, i.e. those mentioned above. Those polymers containing reactive carboxylic acid and/or anhydride groups are exemplary carriers.

Examples of suitable polymers which may be used as carriers for the enzymes include those mentioned in the above-identified publication including such materials as aminoethylated cellulose, diazobenzyl cellulose, diazotized p-aminobenzyl cellulose, amino-s-triazine cellulose, acid chlorides of carboxylic or sulfonic acid ion-exchange resins, cargboxymethyl cellulose azide, bromoacetyl cellulose, methacrylic acid-methacrylic acid-3-fluoro-4,6-dinitroanilide copolymers, the diazotized-m-aminobenzyloxymethyl ether of cellulose, diazotized poly-p-aminostyrene, the diazotized copolymer of p-aminophenylalanine and leucine, phosgenized poly-p-aminostyrene, ethylene-maleic anhydride copolymers, polyisothiocyanate derivatives of poly-p-aminostyrene, polystyrylmercuric acetate, acrylamide-methylene-bis-acrylamide copolymer gels, polyacrylamide, poly-4-hydroxy-3-nitrostyrene and the like. Examples of other carriers which may be used include porous glass, asbestos, charcoal and the like.

These exemplary carriers, which are merely representative of those useful and which listing is in no way to be considered as all-inclusive, if polymeric, may be (1) cross-linked to render them water-insoluble or (2) non-cross-linked if already water-insoluble. When cross-linked, suitable cross-linking agents such as bis-diazobenzidine, bis-diazohexane, N,N'-(1,2-phenylene-bis-maleimide), phenol-2,4-disulfonyl chloride, m-xylene diisocyanate, epichlorohydrin, p-nitrophenyl chloro-acetate, tris[1-(2-methyl)aziridinyl]phosphine oxide, diamines such as hexamethylene diamine and the like may be used in the production of such systems.

A preferred class of useful carriers comprises a hydrophilic, sulfited polymer to which the enzymes may be covalently bound. By the term "hydrophilic," as used herein, is meant that the sulfited polymer is swellable in or capable of taking up water but is not substantially soluble therein. The compositions can contain hydrophobic members or portions provided that they also have hydrophilic portions which function as such when in contact with water. These compositions are prepared depending, of course, upon the specific polymer being used as a carrier, by rendering the polymer susceptible to reaction with the enzyme. In the case of most aldehyde polymers, the polymer is first made hydrophilic by reaction with a suitable solubilizing agent such as a sulfite a hydrosulfite, a bisulfite, sulfurous acid etc. Specifically, alkali metal or alkaline earth metal sulfites, hydrosulfites or bisulfites such as sodium, potassium, calcium etc. bisulfite; sodium, potassium, calcium sulfites; sodium, potassium, calcium, hydrosulfites and the like. The reaction is conducted at a temperature ranging from about 25°C. to about 90°C., at atmospheric pressure, although super-atmospheric or sub-atmospheric pressure can be utilized if desired, the process being more specifically disclosed in U.S. Pat. Nos. 2,657,192 and 3,271,334 hereby incorporated herein by reference. By the term "sulfited," as used herein, is meant that the carbonyl polymer has been contacted with a sulfite so as to chemically modify it. It should not be construed, however, to necessarily mean that any added sulfite groups per se remain on the polymer after enzyme binding, although such may be the case.

After the bisulfite treatment, the sulfited polymers are then immobilized e.g. insolubilized, such as by cross-linking them with a cross-linking agent or immobilizing agent used for this purpose. For example, the general procedure taught in U. S. Pat. No. 3,459,710, also hereby incorporated herein by reference, can be followed. In this method, the bisulfite-polymer adduct or reaction product is contacted with a diamine such as ethylene diamine, tetramethylene diamine, N-methylethylene diamine, 1,6-hexane diamine, etc. at a temperature of about 0°–150°C. and in the presence of a solvent.

Insolubilizing the sulfited aldehyde or ketone polymer adduct can also be accomplished in a multiplicity of other ways such as by vinyl cross-linking i.e. first producing an aldehyde or ketone polymer containing unsaturation and the reacting it, after sulfite treatment, with a polyunsaturated cross-linking agent such as divinyl benzene etc. Insolubilizing can also be effected by using any other polyfunctional compound which will cause the formation of a polymeric network via reaction with the sulfited polymer adduct through available sites such as vinyl groups, OH groups etc. Grafting of the sulfited polymer can also be accomplished to render the polymer immobilized. Additionally, the insolubilication can be effected by reacting the sulfited polymer adduct with such agents as 4-aminophenyl sulfide hydrochloride salt etc. through available groups on the ketone or aldehyde polymers.

If desired, the insolubilizing step may be accomplished first and the sulfite reaction second, the only criteria being that the resultant product is in such a state so as to allow reaction thereof with the enzyme.

The enzyme is reacted with the sulfited, hydrophilic polymer at a temperature below that at which it, the enzyme, is deactivated. The temperature at which specific enzymes are deactivated are well known to those skilled in the art and therefore need not be enumerated herein. Suffice it to say that generally temperatures below about 75°C., preferably from about 5°C. to about 65°C. should be used. The reaction is preferably carried out in the presence of buffers to control the pH of the reaction mixture at a desired level and with agitation, the particular pH being governed by the particular enzyme being bound, according to known techniques.

The enzyme must be bound to the sulfited carbonyl polymer in the presence of an aqueous medium, in that non-aqueous solvents generally tend to inactivate the enzymes. Binding the enzyme in the presence of water generally results in the required amount of water being contained in the final composition. That is to say, at least about 5 percent, by weight, of the final composition should constitute water, with a preferred amount ranging from about 5 to about 300 percent, by weight. This concentration of water results in the most ideal compositions from the standpoint of their ultimate utility. If the product resulting from the enzyme binding does not inherently contain the proper amount of water, the concentration can be brought up to the required amount by merely washing with water. Excess water can be removed by drying under very mild conditions. The basic requirement, as mentioned above, of the instant compositions is that the final enzyme-polymer composition must be hydrophilic, as defined, in order that it may be utilized in the enzymatic conversion of substrates to their conversion products.

For example, in a specific embodiment, polyacrolein, a water-insoluble polymer which contains some groups with which most enzymes are reactive, is first contacted with a sulfite such as sodium bisulfite in order to render it water-soluble and more susceptible to enzyme reaction. In such a condition, however, the polymer cannot be reacted with an enzyme because recovery of any product thereof is relatively impossible. Cross-linking of the sulfite-polymer product, however, renders it gel-like in consistency and effectively hydrophilic so as to allow reaction with the enzyme. As a result, the sulfite-polyacrolein product is cross-linked with a diamine such as hexamethylene diamine. Based on theory, the result of these two reactions is that the sulfite breaks some of the heterocyclic rings of the polyacrolein creating more enzyme-reactive aldehyde groups thereon, in addition to a series of sulfite groups. The diamine reacts with some of these aldehyde groups with the formation of —CH=N— linkages between two polymer molecules, thereby cross-linking the polyacrolein. Reaction of the enzyme, e.g. invertase, forms an adduct or covalent bond between the enzyme and the other available aldehyde groups, and also may result in reaction through the sulfite groups. The resultant adduct is then comprised of a series of cross-linked groups, free aldehyde groups, heterocyclic sulfite reaction groups and bound enzyme groups.

Examples of carbonyl polymers which are included herein include those produced according to any known procedure from such aldehyde monomers as acrolein; α-alkyl acroleins, e.g. methacrolein, α-propylacrolein; crotonaldehyde; 2-methyl-2-butenal; 2,3-dimethyl-2-butenal; 2-ethyl-2-hexenal; 2-decenal; 2-dodecenal; 2-methyl-2-pentenal; 2-tetradecenal and the like, alone or in admixture with up to 95 percent, by weight, based on the total weight of the copolymer, of each other and/or such other copolymerizable monomers known to react therewith such as unsaturated alcohol esters e.g. the allyl, crotyl, vinyl, butenyl etc. esters of saturated and unsaturated aliphatic and aromatic monobasic and polybasic acids such as acetic, propionic, butyric, valeric, adipic, maleic, fumaric, benzoic, phthalic, terephthalic, etc. acids; vinyl cyclic compounds (including monovinyl aromatic hydrocarbons) e.g. styrene, o-, m-, and p-chlorostyrenes, -bromostyrenes, -fluorostyrenes, -methylstyrenes, -ethylstyrenes, various polysubstituted styrenes, e.g. di-, tri-, and tetra-chlorostyrenes, -bromostyrenes etc.; vinyl naphthalene, vinyl chloride, divinyl benzene, allyl benzene, vinyl pyridine, diallyl benezene; various α-substituted and α-substituted, ring-substituted styrenes, e.g. α-methyl styrene, α-methyl-p-methyl styrene, etc.; unsaturated ether, e.g. ethylvinylether, etc.; unsaturated amides e.g. acrylamide, methacrylamide etc.; N-substituted acrylamides, e.g. N-methylolacrylamide, N-allyl acrylamide, N-methyl acrylamide etc.; acrylates such as the methyl, ethyl, propyl, butyl etc. acrylates and methacrylates; nitriles such as acrylonitrile and other comonomers shown, for examples, in U. S. Pat. No. 2,657,192 mentioned hereinabove.

Similarly, such polymers as the copolymers of ethylene and carbon monoxide and various glyoxal adducts, all well known in the art, can be utilized herein.

Examples of other carbonyl polymers which may be utilized include those produced according to any known procedure and in amounts similar to those indicated above in regard to the aldehyde polymers from such ketone monomers as methyl vinyl ketone, methyl allyl ketone, ethyl vinyl ketone, methyl isopropenyl ketone, ethyl allyl ketone, etc. phenyl vinyl ketone, p-tolylvinyl ketone. Also, I may use such polymers as poly(vinyl-pyridinium ketones) and haloketones; copolymers of the above-mentioned aldehyde monomers and ketone monomers with or without the above-disclosed copolymerizable comonomers; polyacetal and the like.

The molecular weights of th polymers used is not critical and those as low as 1000 can be used.

Exemplary of the enzymes which may be utilized to produce the materials include proteolytic enzymes, hydrolases, amylases, dehydrogenases, kinases, oxidases, deaminases, amidases, etc. including lactic dehydrogenase, creatine, phosphokinase, trypsin, papain, ribonuclease, alk. phosphatase, amyloglucosidase, dextranase, glucose oxidase, glucose isomerase, amidase, penicillin amidase, chymotrypsin, β-galactosidase, pyruvate kinase, ficin, pepsin, cholinesterase, carboxypeptidase, streptokinase, plasminogen, urease, aspergillo peptidase, invertase, amylase, alcohol dehydrogenase diastase, β-glycosidase, maltase, lactase, amygdalase, lipase, steapsin, erepsin, bormelain, rennin, zymase, catalase, melibiase, pectolase, protease, pectinase, tyrosinase, cytase, lysozime, cellulase, adenase, guanidase, carboxylase, inulase, vinegar oxidase, aldehydase, rhamnase, myrosinase, phytase, tannase, carbamase, nuclease, guanase, adenase, Dna and Rna polymerase, thrombase, chymase, cozymase and the like.

As mentioned briefly above, the carrier bound enzymes become deactivated upon storage, shipment etc. and in such a condition they cannot function in the normal (natural) manner so as to convert substrates to their conversion products. I have found that by freeze-drying the carrier bound enzyme from a solution of the same substrate which is normally converted to its conversion product by the enzyme, the activity can be maintained even at temperatures which would normally deactivate the particular enzyme involved. At least about 1.0 percent, by weight, of substrate has generally been found to be sufficient, although higher concentrations, i.e. up to about 50 percent, by weight, can be used.

The carrier bound enzyme, being water-insoluble, is suspended in a substrate solution at a pH within 1.5 pH units of the optimum pH at which the substrate is catalytically acted upon by the enzyme. The pH may be adjusted to the appropriate value by any known means such as by adding acids such as dilute hydrochloric acid or bases such as dilute sodium hydroxide etc. and freeze-dried. Thus, for example, polymer bound invertase can be suspended in an aqueous sucrose solution at a pH of 4.8 (± 1.5) and freeze-dried to a powdery consistency, stored and shipped and then be continually contacted therewith to convert the sucrose to invert sugar. The catalytic activity of the invertase has thereby been maintained for a longer period of time than if the material is not freeze-dried. By "catalytically active" or "active catalytic activity," as utilized herein is meant the ability or availability of the bound enzyme to convert a particular substrate to its conversion product.

The freeze-drying per se of the suspended carrier bound enzyme material is accomplished in a manner similar to known freeze-drying procedures. That is to say, the suspended material is frozen by any convenient means such as by immersing in a dry ice-acetone mixture and the resultant frozen material is subjected to the action of a vacuum pump. The freezing temperature generally ranges from about −30°C. to about −78°C. and the frozen material is then subjected to the vacuum pumping action whereby sublimation of the ice is accomplished. The pumping speed should be sufficient to maintain the material in a solid state even on gentle warming of the material such as by exposure thereof to ambient conditions. The sublimation is continued, generally for from 1–24 hours, until the water is substantially completely removed from the frozen material and a very porous structured material remains. This remaining material comprises the carrier bound enzyme having coated thereon or dispersed throughout the surface area thereof, the substrate which the enzyme normally converts to its conversion product. This freeze-drying or "lyophilization" technique results in a stable carrier bound enzyme that can be stored, shipped etc. over a long period of time.

Incorporation of various preservatives such as antimicrobials, antioxidants, antibiotics for the prevention of bacteria formation, fungal growth etc., as is known in the art, is also preferred according to the instant invention. As can be readily appreciated, growth or formation of bacteria etc. in the suspension of carrier bound enzyme will not enhance and will probably deleteriously affect the catalytic activity of the enzyme. Accordingly, concentrations of less than about 1.0 percent, by weight, of preservative should be added to the suspension. Examples of suitable additives include benzoic acid and its sodium and potassium salts; alkyl esters of p-hydroxybenzoic acid; propionates such as sodium propionate; sodium bisulfite; sodium metabisulfites; sodium diacetate; o-phenylphenol; butylated hydroxyanisole; lecithin; citrates such as monoglyceride citrate; stearyl citrate etc.; oxytetracycline, chlortetracycline; benzyl alcohol; phenyl; calcium sorbate; sorbic acid, mixtures thereof and the like.

The following examples are set forth for purposes of illustration only and are not to be construed as limitations on the present invention exept as set forth in the appended claims. All parts and percentages are by weight unless otherwise specified. Preservative (0.1% benzoic acid) was added in each instance as a precaution against microbial and fungal growth or contamination.

EXAMPLE 1

(Comparative)

A. Cross-linked Polyacrolein-sodium bisulfite addition complex.

0.88 Part of 1,6-hexane diamine, containing 3 parts of water, is slowly added, with stirring, to 44 parts of a 10% solution of polyacrolein-sodium bisulfite adduct (m.w. 80,000). The mixture is then heated to 85°C. for 20 minutes and the yellow hydrophilic product which forms is then washed until neutral with distilled water and filtered.

The wet hydrophilic adduct thus obtained is suspended in 50 parts of water and reacted with 0.104 part of invertase (twice recrystallized) which had been first dissolved in 4 parts of water. The enzyme reaction mixture (pH 6.5) is gently stirred for 18 hours at 10°C. and the resulting hydrophilic covalently bound enzyme polymer adduct is then washed free of unreacted enzyme. Assay of the hydrophilic enzyme-polymer adduct shows high activity with sucrose solution, in the form of the filtered wet cake. The cake is air dried and after one day, the activity of the enzyme is substantially depleted at room temperature as evidenced by its failure to convert sucrose to invert sugar upon contact therewith at a 10 percent concentration and a pH of 4.8.

EXAMPLE 2

The procedure of Example 1 is again followed except that the filtered wet cake is suspended in a 10 percent aqueous sucrose solution at pH 4.8 and frozen from a dry ice-acetone bath. After freezing, the frozen material is attached to a high vacuum system and dried to a fine powdery consistency. The catalytic activity of the resultant polymeric product is substantially the same 9 weeks later as when produced as evidenced by a 72 percent conversion of sucrose to invert sugar therewith.

EXAMPLE 3

5 Parts of a copolymer of acrolein-styrene (93.8:6.2 weight ratio, respectively) are suspended in 40 parts of water containing 4.3 parts of sodium metabisulfite at pH 5.7. The mixture is stirred over nitrogen at 65°C. for 5 hours, resulting in a completely water-soluble product. To this bisulfite addition product is slowly added, with stirring, 2 parts of 1,6-hexane diamine dissolved in 10 parts of water. The reaction mixture is stirred at 70°C. for one hour. The resultant cross-linked, hydrophilic copolymer is filtered, washed to neutral pH, suspended in 20 parts of water and reacted with 4 ml. of technical grade ($k=.6$) invertase at 18°C. for 15 hours. The resulting covalently bound enzyme polymer adduct is washed free of unbound enzyme with distilled water, filtered (7.97 parts wet), suspended in sucrose solution and freeze-dried as in Example 2. The adduct maintains its catalytic activity at room temperature for 9 weeks.

EXAMPLE 4

The procedure of Example 3 is again followed except that 10 parts of a copolymer of acrolein-acrylonitrile (93.1:6.9 weight ratio, respectively) are used as the polymeric material. The bound enzyme product is recovered, suspended in a 10 percent aqueous sucrose solution and freeze-dried. The powdery product is catalytically active 8 weeks later.

EXAMPLE 5

The procedure of Example 3 is again followed except that the polymer is produced from 10 parts of a copolymer of acrolein-acrylic acid (85:15 weight ratio, respectively). The catalytic activity of the resultant polymer bound enzyme material is maintained for about 7 weeks upon freeze-drying it from a suspension in a 30 percent aqueous sucrose solution at a pH of 6.3.

EXAMPLE 6

Substitution of polymethacrolein for the polymer of Example 2 results in a bound enzyme product, the catalytic activity of which is maintained for 7 weeks by suspending it in a 50 percent aqueous sucrose solution at room temperature and freeze-drying as in Example 2.

EXAMPLE 7

The procedure of Example 5 is again followed except that a methacrolein-styrene (50:50) copolymer (U. S. Pat. No. 2,945,006) is substituted for the polymer used therein. Subsequent suspension of the recovered polymer bound enzyme in a 22 percent aqueous sucrose solution at pH 3.3 and freeze-drying to a powder prevents catalytic activity degradation thereof for 8 weeks.

EXAMPLE 8

10 Parts of poly(methylvinyl ketone) are treated with 80 parts of water containing 8 parts of sodium bisulfite at pH 5.8 at 65°C. for 18 hours over a nitrogen atmosphere. The resultant bisulfite adduct is then treated with 1.6 parts of ethylene diamine dissolved in 16 parts of water, with stirring, for 25 minutes at 65°C. The hydrophilic polymer is then washed to neutral pH and filtered. The wet cake is suspended in 55 parts of water and reacted with 4 ml. of technical grade invertase ($k=.6$) at 18°C. for 16 hours. The resulting covalently bound enzyme polymer adduct is washed free of unbound invertase with distilled water and filtered (18.2 g. wet). The adduct is separated into two portions. One portion is air dried and the second portion is suspended in a 10 percent aqueous sucrose solution and thereafter freeze-dried as in Example 2. The catalytic activity of the first is substantially depleted after one day while the second is catalytically active 10 weeks later.

Following the procedures of Example 1 or Example 8 except that various copolymers or other homopolymers are substituted for the polymers utilized therein, bound invertase compositions are prepared, suspended in a 10 percent aqueous sucrose solution and freeze-dried as in Example 2 prior to use for the conversion of sucrose to invert sugar. The results are set forth in Table I, below.

TABLE I

| Ex. | Carbonyl Polymer | No. weeks still active after freeze-drying |
|---|---|---|
| 9 | Acrolein-methylvinyl ketone (45/55) (m.w. 1400) | 6 |
| 10 | Acrolein-β-allyloxyethanol (80/20) | 7 |
| 11 | Acrolein-allyl glycolate (80/20) | 5 |
| 12 | Poly(vinylethyl ketone) | 7 |
| 13 | Polyvinylmethylacetal | 5 |
| 14 | Methylvinyl ketone-methyl methacrylate (70/30) | 7 |
| 15 | Acrolein-methyl acrylate (40/60) | 7 |
| 16 | Acrolein-butadiene (50/50) | 6 |
| 17 | Acrolein-ethyl acrylate-styrene (25/20/55) | 5 |
| 18 | α-methyl acrolein-methyl methacrylate (50/50) | 10 |
| 19 | Acrolein-vinyl acetate (60/40) | 7 |
| 20 | Poly(isopropenylmethyl ketone) | 6 |
| 21 | Methylvinyl ketone-vinyl acetate (5/95) | 8 |
| 22 | Acrolein-glycidyl methacrylate (40/60) | 8 |

EXAMPLE 23

10 Parts of wet ($\sim$ 10 percent solids) cross-linked polyacrolein-sodium bisulfite addition complex (as prepared in Example 1) are suspended in 40 parts of water at pH 3.5 and reacted with 0.110 part of crystalline trypsin, dissolved in 4 parts of water. The reaction mixture is stirred for 18 hours at 10°C. and at the end of this time the resulting covalently bound trypsin adduct is washed until free of unbound enzyme. Analysis of the washings at 280 mµ indicates that 78.2% of the enzyme is bound to the polymer. The wet polymer enzyme cake is suspended in a 5 percent aqueous casein solution at pH 8.1 and freeze-dried as in Example 2. The product is recovered and, on assay, affords 17.2 units of activity per mg. of enzyme (native enzyme 66 units/mg.), therefore possessing 26.1 percent of the original activity. The analytical procedure used is the standard pH stat method (pH 7.9) using benzoyl arginine ethyl ester (BAEE) substrate. Without freeze-drying the polymer cake in casein solution but air drying, the activity cases in 48 hours.

EXAMPLE 24

2.5 Parts of poly(isopropenylmethyl ketone) are stirred with 25 parts of water containing 2.1 parts of potassium metabisulfite at pH 5.8 for 16 hours at 75°C. over a nitrogen atmosphere. At the end of this time, 1.3 parts of 2-(2-amino-ethyl)-5(6)-aminoethylbicyclo - 2.2.1 heptane in 5 parts of water are added to the above reaction mixture and stirred at 80°C. for 25 minutes. The hydrophilic adduct which results is washed to neutral pH and filtered. The wet cake is suspended in 30 parts of water and reacted with 0.025 part of glucose oxidase dissolved in 2 parts of water at 10°C. for 18 hours. The resultant covalently bound enzyme is washed free of unbound glucose oxidase with cold distilled water and filtered. A portion of the product is suspended in a 10 percent aqueous glucose solution at pH 5.5 and freeze-dried as in Example 2 while a second portion is air dried. Assay of 0.5 percent of the freeze-dried powdery product 9 weeks later using the standard pH stat procedure (pH 6.3) (substrate: 50 ml. of 1 percent glucose solution with excess oxygen) in which the liberated gluconic acid is titrated with standard .01N NaOH indicates that the activity of the adduct is 17.7 units/mg./min. (native glucose oxidase assays 20.5 units/mg./min.). The air dried portion of originally the same activity is substantially depleted in 36 hours.

EXAMPLE 25

40 Parts of distilled acrolein and 20 parts of a commercially available low molecular weight unsaturated polyester of maleic acid and dipropylene glycol containing 30 percent of vinyl toluene are combined with 0.5 part of $\alpha,\alpha'$-azobis-$\alpha,\alpha$-dimethylvaleronitrile and allowed to polymerize at room temperature for 4 days under a nitrogen atmosphere. The resulting solid cross-linked plug is chopped up to 100 mesh pieces, washed with water and filtered. A portion (10 parts) of this polyacrolein graft is treated with 8.5 parts of sodium metabisulfite and 90 parts of water at pH 5.6 at 62°C. for 18 hours over a nitrogen atmosphere. At the end of this time the hydrophilic sodium bisulfite adduct is isolated by filtration and washed with water. The wet adduct is suspended in 50 parts of water and treated with 4 ml. of technical grade invertase ($k=.6$) at 15°C. for 16 hours. The reaction mixture is washed free of unbound enzyme and assayed for activity. 5Percent of the wet product converts 100 ml. of a 10 percent sucrose solution (same experimental conditions as in Example 1) to 41 percent invert sugar. The activity of the same product 8 weeks after freeze-drying it from a 10 percent aqueous sucrose solution as in Example 2 is 37 percent. Air dried product, after one day, has an activity of 7 percent.

EXAMPLE 26

90 Parts of acrolein are reacted at room temperature with 10 parts of methylene bisacrylamide and 0.1 part of $\alpha,\alpha'$-azobis-$\alpha,\alpha$-dimethylvaleronitrile for 3 days under a nitrogen atmosphere. The resultant solid, cross-linked copolymer (8.3 percent weight percent bisacrylamide) is washed with water, filtered and dried at room temperature to constant weight. 10 Parts of the dried, cross-linked copolymer are then treated with 8.6 parts of sodium metabisulfite dissolved in 82 parts of water at pH 5.6 at 65°C. with stirring for one day over nitrogen. The resultant hydrophilic bisulfite adduct is filtered and washed with water. The wet bisulfite adduct (147 parts) is suspended in 150 parts of water and treated with 12 ml. of technical invertase solution ($k=0.6$) with stirring at 10°C. for 18 hours. The reaction mixture is washed free of unbound invertase and assayed for activity. 5 Percent of the wet product converts 100 ml. of 10 percent sucrose solution (same experimental conditions as Example 1, above) to 32 percent invert sugar. A conversion of 30 percent is recorded utilizing a freeze-dried powder produced from a 10 percent aqueous sucrose solution thereof as in Example 2. An air dried portion of the product shows no activity after 30 hours at ambient temperature.

Following the techniques of the previous examples, various other enzymes are covalently bound to the polymeric materials disclosed therein to produce a hydrophilic enzyme composition which is then freeze-dried from its suitable substrate solution. The results are set forth in Table II, below.

TABLE II

| Example | Example procedure followed | Enzyme bound[1] | Substrate solution from which freeze-dried | Results 6 weeks after freeze-drying |
|---|---|---|---|---|
| 27 | Example 2 | glucose isomerase | 20% aqueous invert sugar solution—pH 7.5. | Converts glucose to fructose. |
| 28 | Example 7 | glucoamylase | 15% solution of liquified starch in water—pH 4.2. | Converts polysaccharides to glucose. |
| 29 | Example 9* | $\alpha$-amylase | 10% solution of liquified starch in water—pH 6.9. | Continuously hydrolyzes polysaccharides to glucose and maltose. |
| 30 | Example 23** | tyrosinase | 2% tyrosine in water-glycerol (90/10) solution—pH 6.5. | Tyrosine converted continuously to dihydroxyphenylalanine. |
| 31 | Example 26*** | pectinase | 1% pectin in water-methanol (98/2) solution—pH 8.0. | Acts on pectin continuously to form pectic acid. |

[1] In each instance, air dried polymer bound enzyme lost its activity after 24 hours.
* Except 2.4 parts of 4-aminophenyl sulfide hydrochloride salt used in place of diamine thereof.
** Except 1.5 parts of isophorone diamine used as replacement for diamine thereof.
*** Except that the bisacrylamide thereof is replaced by divinyl benzene.

EXAMPLE 32

A commercially available polymer bound enzyme comprising chymotrypsin on carboxymethyl cellulose is suspended in a 1.0 percent aqueous casein solution at pH 7.8 and freeze-dried as in Example 2. The activity of the enzyme material is evident 3 weeks later whereas a similar polymer, without freeze-drying, deactivates in 22 hours at room temperature.

EXAMPLES 33–46

Other water-insoluble, hydrophilic carrier bound enzymes are stabilized by freeze-drying them from a suitable substrate solution, stored at 5°C. and are found to be catalytically active 2–6 weeks thereafter. Storage of the non-freeze-dried materials in air at 5°C. causes deactivation in 36–48 hours in each instance. The carrier bound enzymes freeze-dried were:

33. trypsin adsorbed on charcoal from a 1.5 percent aqueous hemoglobin solution at pH 7.5.
34. ribonuclease bound to carboxymethyl cellulose from a 0.5 percent aqueous ribonucleic acid solution at pH 7.0.

35. chymotrypsin bound to p-aminobenzyl cellulose from a 1.0 percent aqueous casein solution at pH 7.0.

36. papain covalently coupled to the water-insoluble diazonium salt of a p-amino-DL-phenylalanine-L-leucine copolymer from a 1.0 percent aqueous hemoglobin solution at pH 6.5.

37. invertase bound to methacrylic acid-methacrylic acid-3-fluoro-4,6-dinitroanilide copolymer from a 10.0 percent aqueous sucrose solution pH 4.2.

38. L-asparaginase adsorbed in the pores of porous glass from a 2.0 percent aqueous L-asparagine solution at pH 7.4.

39. glucose isomerase adsorbed on asbestos from a 5.0 percent aqueous glucose solution at pH 6.5.

40. trypsin entrapped in an acrylamide-methylenebisacrylamide gel from a 2.0% aqueous casein solution at pH 8.9.

41. trypsin bound to bromoacetyl cellulose from a 1.0 percent aqueous casein solution at pH 8.4.

42. papain bound to collagen cross-linked with benzidene from a 1.0 percent aqueous gelatin solution at pH 6.0.

43. pepsin bound to poly-p-aminostyrene from a 1.5 percent aqueous casein solution at pH 4.5.

44. ficin bound to carboxymethyl cellulose from a 1.0 percent aqueous casein solution at pH 6.0.

45. glucoamylase bound to carboxymethyl cellulose azide from a 15 percent aqueous starch solution at pH 5.5.

46. chymotrypsin bound to p-amino-DL-phenylalanine-L-leucine copolymer from a 1.0 percent aqueous casein solution at pH 6.3.

I claim:

1. A method for maintaining the catalytic activity of an enzyme covalently bound through available aldehyde or ketone groups to a hydrophilic, cross-linked aldehyde or ketone polymer containing sulfite groups chemically attached thereto which comprises suspending said bound enzyme in an aqueous solution of the substrate which is normally converted to its conversion product by the bound enzyme at a pH within 1.5 units of the optimum pH at which the substrate is catalytically acted upon by the enzyme and freeze-drying the resultant suspension.

2. A method according to claim 1 wherein said polymer is an aldehyde polymer.

3. A method according to claim 1 wherein said polymer is a ketone polymer.

4. A method according to claim 2 wherein said polymer is an acrolein polymer.

5. A method according to claim 1 wherein said enzyme is invertase.

6. A method according to claim 2 wherein said enzyme is invertase.

7. A method according to claim 2 wherein said enzyme is invertase and said polymer is polyacrolein.

8. A freeze-dried mixture of (1) a hydrophilic polymer having a catalytically active enzyme bound thereto and (2) a substrate which is normally converted to its conversion product by said bound enzyme produced according to claim 1.

9. A product according to claim 8 wherein said polymer is an aldehyde polymer.

10. A product according to claim 8 wherein said polymer is a ketone polymer.

11. A product according to claim 8 wherein said polymer is an acrolein polymer.

12. A product according to claim 8 wherein said enzyme is invertase.

13. A product according to claim 8 wherein said enzyme is invertase and said polymer is polyacrolein.

* * * * *